United States Patent
Ida et al.

(10) Patent No.: US 7,436,512 B2
(45) Date of Patent: Oct. 14, 2008

(54) SPECTROSCOPE

(75) Inventors: Katsumi Ida, Toki (JP); Takeshi Ikeda, Hachioji (JP)

(73) Assignee: National Institutes of Natural Sciences, Toki-shi, Gifu (JP)

( * ) Notice: Subject to any disclaimer, the term of this patent is extended or adjusted under 35 U.S.C. 154(b) by 288 days.

(21) Appl. No.: 11/297,117

(22) Filed: Dec. 8, 2005

(65) Prior Publication Data

US 2006/0124840 A1   Jun. 15, 2006

(30) Foreign Application Priority Data

Dec. 9, 2004   (JP) .............................. 2004-356640

(51) Int. Cl.
*G01J 3/18*   (2006.01)
*G01J 3/28*   (2006.01)

(52) U.S. Cl. .................................... 356/328

(58) Field of Classification Search ................. 356/326, 356/328
See application file for complete search history.

(56) References Cited

U.S. PATENT DOCUMENTS

| | | |
|---|---|---|
| 4,375,919 A | 3/1983 | Busch |
| 4,678,332 A | 7/1987 | Rock et al. |
| 5,080,486 A | 1/1992 | Shirasaki et al. |
| 2003/0071993 A1 | 4/2003 | Zhao et al. |

FOREIGN PATENT DOCUMENTS

DE   19728966   10/1998

OTHER PUBLICATIONS

Japanese Patent Abstract Publication No. 2003-042846 for "High-Resolution Aberration Correction Spectroscope," published Feb. 13, 2003.
Espace Patent Abstract for JP2001013006, published Jan. 19, 2001.
Japanese Patent Abstract Publication No. 2003-042846, published Feb. 13, 2003, entitled "High-Resolution Aberration Correction Spectroscope," one page.

*Primary Examiner*—F. L Evans
(74) *Attorney, Agent, or Firm*—Rankin, Hill & Clark LLP

(57) ABSTRACT

A spectroscope is described comprising an incident slit, a collimator lens type optical system that makes the light rays having passed through the incident slit parallel light rays, a reflection type diffraction grating that receives the parallel light rays and, according to the wavelength, outputs these light rays at different angles, a condenser lens type optical system that condenses the output light from the diffraction grating, and a two-dimensional detector having a two-dimensional light-receiving surface that detects the light rays that have been condensed by the condenser lens type optical system.

7 Claims, 9 Drawing Sheets

SPECTROSCOPE

RELATED APPLICATIONS

This application claims priority to the Japanese Patent Application 2004-356640 dated on Dec. 9, 2004 and is hereby incorporated with reference for all purposes.

BACKGROUND OF THE INVENTION

1. Field of the Invention

The present invention relates to a polychromator type spectroscope and, more particularly, to the improvement in its spatial resolving power.

2. Description of the Related Art

A spectroscope is intended to widely disperse the light ranging from the ultraviolet region to the visible light region. To this end, a mirror is used as the condenser optical system. However, a conventional type mirror spectroscope had the drawbacks such as (1) that in which the imageability differs between the center and peripheral part of the light-receiving surface and the performance at the peripheral zone is poor, (2) that in which the aperture ratio is inferior, etc. Also, regarding the use of a lens, in many cases, it is not used for the reason that the ultraviolet region becomes unable to be measured. Generally, therefore, an endeavor to obtain a high level of spatial resolving power by improving the mirror has hitherto been made and, in this view, a spectroscope using toroidal mirrors or the like have hitherto been developed. (For example, see the Japanese Patent Application Laid-Open No. 2003-42846)

Also, by arraying the optical fibers in a row in the incident slit of the polychromator, the light rays from a number of points are spectrally simultaneously measured. The light rays from the respective optical fibers are dispersed through the action of the diffraction grating and thereby these light rays are imaged on the light-receiving surface of the two-dimensional detector. However, as described above, in the conventional spectroscope, since the spatial resolving power is low and the images in the slit direction are widely spread, there was a problem in that the images of the light rays from the respective optical fibers overlap one another. Also, even in the spectroscope in which to correct the above-described astigmatism with use of a toroidal mirror or the like, the manufacturing cost is incurred and, in terms of the performance as well, it was not satisfactory.

SUMMARY OF THE INVENTION

Accordingly, in view of the foregoing problems, the present invention has been made and an object of the invention is to provide a spectroscope that is high not only in the wavelength resolving power but also in the spatial resolving power.

To attain the above object, the inventors of this application made their earnest studies and examinations and have succeeded in obtaining a high level of space resolving power by using as the condenser optical system not the mirror optical system conventionally generally used but the lens optical system and examining the optical disposition of it.

Namely, a spectroscope of the present invention comprises an incident slit, a collimator lens type optical system that makes the light rays passing through the incident slit parallel light rays, a diffraction grating that receives the parallel light rays and, according to a wavelength, outputs these light rays at different angles, a condenser lens type optical system that condenses the output light from the diffraction grating, and a two-dimensional detector having a two-dimensional light-receiving surface that detects the light rays that have been condensed by the condenser lens type optical system. The collimator lens type optical system and the condenser lens type optical system are disposed so that an angle $2\gamma$ defined between the optical axis of the collimator lens type optical system and an optical axis of the condenser lens type optical system may be acute. The condenser lens type optical system is disposed so that the distance between itself and the diffraction grating may be shorter than a distance between the collimator lens type optical system and the diffraction grating. The diffraction grating is a reflection type diffraction grating, whereby a setting is made so that a normal line vector at a central point of the reflection surface may be directed, from a bisector of the angle defined between the optical axis of the collimator lens type optical system and the optical axis of the condenser lens type optical system, toward a side where the collimator lens type optical system is disposed. The light rays passing the incident slit are dispersed by the diffraction grating to cause a dispersion light image of the slit to be imaged on the light-receiving surface of the two-dimensional detector to spectrally measure the respective points along the direction of the slit.

Here the distance between the condenser lens type optical system and the diffraction grating is defined as the distance between the point at which, of the lenses constructing the condenser lens type optical system, the optical surface on the incident side of the lens the nearest to the diffraction grating and the optical axis of the condenser lens type optical system intersect each other, and the point at which the optical axis of the condenser lens type optical system and a reflection surface of the diffraction grating intersect each other. Similarly, the distance between the collimator lens type optical system and the diffraction grating is defined as the distance between the point at which, of the lenses constructing the collimator lens type optical system, the optical surface on the outgoing side of the lens the nearest to the diffraction grating and the optical axis of the collimator lens type optical system intersect each other, and the point at which the optical axis of the collimator lens type optical system and the reflection surface of the diffraction grating intersect each other.

Further, the angle defined between the optical axis of the condenser lens type optical system and the optical axis of the collimator lens type optical system is defined as the inferior angle defined between the half line consisting of the optical axis that, with the intersection between the optical axis of the condenser lens type optical system and that of the collimator lens type optical system used as the starting point, goes toward the condenser lens type optical system and the half line consisting of the optical axis that, with the intersection point used as the starting point, goes toward the collimator lens type optical system.

Similarly, the angle defined between the normal line vector and the bisector (the half line equally dividing the angle defined between the optical axis of the collimator lens type optical system and the optical axis of the condenser lens type optical system) is defined as being the angle defined between the normal line vector whose the starting point is the point of intersection (the point of intersection between the optical axis of the collimator lens type optical system and the optical axis of the condenser lens type optical system) and the bisector whose starting point is that point of the intersection.

Also, the direction of the normal line vector, when having fixed the starting point of the normal line vector to the point of intersection (the point of intersection between the optical axis of the collimator lens type optical system and the optical axis of the condenser lens type optical system), is defined depending on the position of the termination point of the normal line vector. Also, the terminology "the direction in which the normal line vector is directed, with respect to the above-described bisector, toward the side where the collimator lens type optical system is disposed" means that, under the assumption that the bisector be made a straight line by extending it, of two regions divided by (the plane parallel to the slit direction and including) this straight line, the termination point of the normal line vector is situated in the region where the collimator lens type optical system is disposed.

In the above-described spectroscope, preferably, the optical systems are disposed so that the angle $2\gamma$ defined between the optical axis of the collimator lens type optical system and the optical axis of the condenser lens type optical system may be in a range of from $20° \leq 2\gamma \leq 40°$; and, further, a setting be done so that the angle $\theta$ defined by the normal line vector of the diffraction grating with respect to the bisector may be in a range of from $5° \leq \theta \leq 45°$.

In the above-described spectroscope, preferably, the angle $\theta$ defined between the bisector and the normal line vector of the diffraction grating is set so that $\theta > \gamma$.

In the above-described spectroscope, preferably, the spectroscope includes a plurality of optical fibers that have been arrayed in a row along the incident slit. The light rays from the respective optical fibers enter from the incident slit and are dispersed by the diffraction grating. The dispersion light images from the respective optical fibers are imaged on the light-receiving surface of the two-dimensional light-receiving detector. Thereby independently spectrally measuring in units of an optical fiber is performed.

In the above-described spectroscope, preferably, as the plurality of optical fibers, an optical fiber bundle is used; at the outgoing side end surface of the optical fiber bundle, the outgoing side end portions of the optical fibers are arrayed in a row along the incident slit; at the incident side end surface, the incident side end portions of the optical fibers are two-dimensionally arrayed. The light rays from the object-to-be-measured surface are received by the incident side end surface of the optical fiber bundle, thereby mapping measurement is performed on the object-to-be-measured surface.

In the above-described spectroscope, preferably, regarding said plurality of optical fibers arrayed in the slit direction, the disposition thereof is made so that the shortest distance between the cores of adjacent two of the optical fibers may be in a range of from 0.025 mm to 0.1 mm.

According to the present invention, the collimator lens type optical system and the condenser lens type optical system are constructed using lenses and are disposed so that the angle $2\gamma$ defined between the optical axis of the collimator lens type optical system and the optical axis of the condenser lens type optical system may be acute; the condenser lens type optical system is disposed so that the distance between itself and the diffraction grating may be shorter than the distance between the collimator lens type optical system and the diffraction grating; and, the diffraction grating is a reflection type diffraction grating, whereby a setting is made so that a normal line vector at the central portion of the reflection surface of the diffraction grating may be directed, from a bisector of the angle defined between the optical axis of the collimator lens type optical system and the optical axis of the condenser lens type optical system, toward a side where the collimator lens type optical system is disposed. Therefore, it is possible to provide a spectroscope having a high spatial resolving power and wavelength resolving power.

DESCRIPTION OF THE PREFERRED EMBODIMENT

A preferred embodiment of the present invention will hereafter be explained with reference to the drawings.

Figure 1:
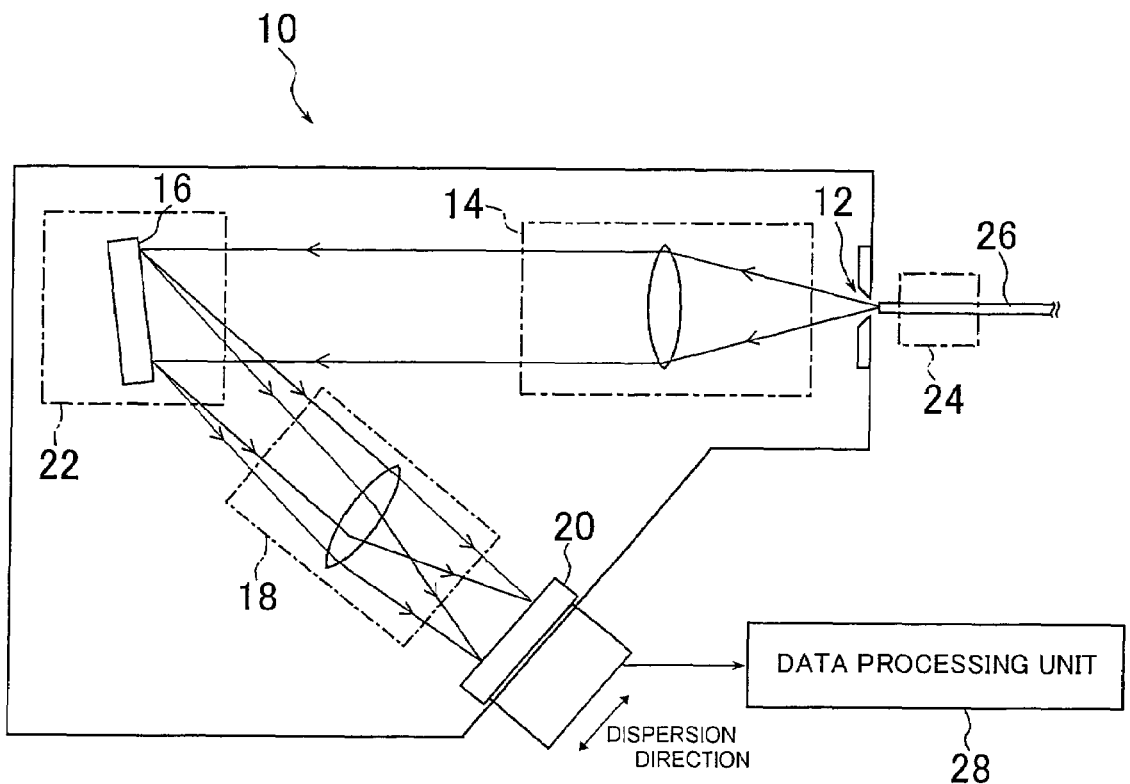
FIG. 1 is a schematic construction view of a spectroscope according to an embodiment of the present invention.

FIG. 1 is a schematic construction view of a spectroscope 10 according to an embodiment of the present invention. The spectroscope 10 comprises an incident slit 12, a collimator lens type optical system 14, a reflection type plane diffraction grating 16, a condenser lens type optical system 18, and two-dimensional detector 20. The light enters the collimator lens type optical system 14 from the incident slit 12. The collimator lens type optical system 14 makes the light parallel light rays. The diffraction grating 16 receives these parallel light rays and, according to the wavelength, outputs light rays at different angles. The output light rays from the diffraction grating 16 are condensed by the condenser lens type optical system 18 and then are imaged on a two-dimensional light-receiving surface of the two-dimensional detector 20. The two-dimensional detector 20 is constructed using a conventional two-dimensional detector such as a CCD detector. A direction that gets, on the light-receiving surface, perpendicular to the direction corresponding to the incident slit 12 becomes a dispersion direction made by the diffraction grating 16. Accordingly, the spectra of respective points along the direction of the slit can simultaneously be measured (see FIG. 4). Also, the detection signal obtained at the two-dimensional detector 20 is sent to data processing unit 28 constructed using a computer, etc. The data processing unit 28 performs appropriate signal processing, storage of data, and so on.

Figure 2:
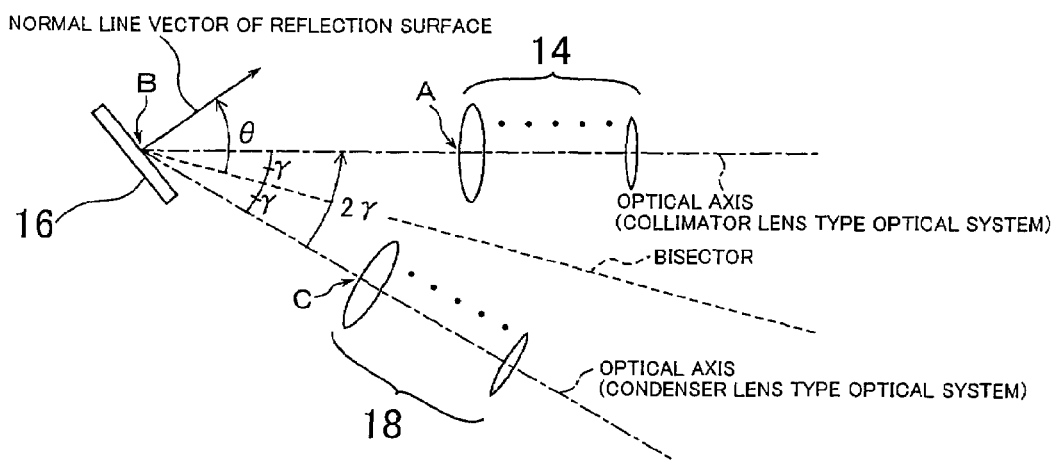
FIG. 2 is an explanatory view of the optical disposition of the spectroscope according to the embodiment of FIG. 1.

In FIG. 1, each of the collimator lens type optical system 14 and the condenser lens type optical system 18 is shown as one lens, but actually it is constructed using an optical system in which a plurality of lenses are combined together to compensate for the aberration (see FIG. 2). For this reason, unlike a conventional spectroscope constructed using a mirror system, spreading of the image is suppressed.

Next, a disposition of the main optical members will be explained with reference to FIG. 2. In this embodiment, the condenser lens type optical system 18 is disposed relative to the collimator lens type optical system 14 in the way in which the former 18 is closer to the diffraction grating 16 than the collimator lens type optical system 14. Namely, the both optical systems are disposed asymmetrically. Namely, the condenser lens type optical system 18 is disposed as closely to the diffraction grating 16 as possible so that the optical system 18 does not shield the parallel light rays coming from the collimator lens type optical system 14. Disposing the condenser lens type optical system 18 as above enables the condenser lens type optical system 18 to condense the flux of the output light coming from the diffraction grating 16 efficiently. Namely, the condenser lens type optical system 18 is constructed so that it may catch the entire dispersed light rays the wavelength range of which is to be measured and, in addition, so that the light-receiving efficiency at the two-dimensional detector 20 with respect to the light rays passing through the condenser lens type optical system 18 at the center is roughly equal to the light-receiving efficiency with respect to the light rays passing through the condenser lens optical system 18 at the peripheral ends. For this reason, it is possible to obtain an excellent level of spectral resolving power.

Here the distance between the condenser lens type optical system 18 and the diffraction grating 16 is defined as the distance between a point C and a point B, the point C at which, of the lenses constructing the condenser lens type optical system 18, the optical surface on the incident side of the lens the nearest to the diffraction grating 16 and the optical axis of the condenser lens type optical system 18 intersect each other, the point B at which the optical axis of the condenser lens type optical system 18 and a reflection surface of the diffraction grating 16 intersect each other. Similarly, the distance between the collimator lens type optical system 14 and the diffraction grating 16 is defined as the distance between a point A and a point B, the point A at which, of the lenses constructing the collimator lens type optical system 16, the optical surface on the outgoing side of the lens the nearest to the diffraction grating and the optical axis of the collimator lens type optical system 14 intersect each other, the point B at which the optical axis of the collimator lens type optical system 14 and the reflection surface of the diffraction grating 16.

Also, by making as small as possible (making at least acute) the angle 2γ defined between the optical axis of the collimator lens type optical system 14 and that of the condenser lens type optical system 18, an aberration is constructed so as to by suppressed. As a result of the aberration's being suppressed, a wavelength resolving power and, in addition, a spatial resolving power in the direction of the slit, also, are enhanced.

The diffraction grating 16 is retained by a diffraction grating holder 22 (see FIG. 1), thereby the structure is constructed so that the orientation of the reflection surface of the diffraction grating 16 can be changed. A setting is provided in such a way that a normal line vector at the central part of the reflection surface of this diffraction grating 16 (it is assumed that the direction of the vector be directed from the reflection surface toward outside the structure) is directed, toward the disposition side of the collimator lens type optical system 14 (to the direction side on which light rays come), with respect to a bisector (a broken line in FIG. 2) of the angle defined between the optical axis of the collimator lens type optical system 14 and that of the condenser lens type optical system 18. This makes it possible to narrow the width of the output light flux from the diffraction grating 16. For this reason, the condenser lens type optical system 18 can condense the light rays within the wavelength range with respect to which measurement is to be made, with a substantially fixed level of efficiency and without being affected by the output angle from the diffraction grating. Namely, since the structure is constructed so that, with respect to the light rays passing through the condenser lens type optical system 18 at right the center and the light rays passing therethrough at the peripheral end edge, the light-receiving efficiencies of the two-dimensional light-receiving detector 20 can be equalized as much as possible, it is possible to achieve excellent wavelength resolving power.

Also, it is further preferable to set so that the angle θ defined by the above-described bisector with respect to the normal line vector of the diffraction grating 16 may have a relationship of θ>γ (namely so that the orientation of the normal line vector may be directed to the side that is opposite to the side where the condenser lens type optical system is disposed when viewed with respect to the optical axis of the collimator lens type optical system). This makes it possible to obtain a clearer formed image over the entire light-receiving surface of the two-dimensional detector.

Concretely, it is preferable that the angle 2γ defined by the optical axis of the collimator lens type optical system with respect to that of the condenser lens type optical system be from 20° to 40°, or more preferably from 20° to 30°. Further, the angle θ defined by the normal line vector of the reflection surface of the diffraction grating 16 with respect to the above-described bisector (the bisector of the angle defined between the optical axis of the condenser lens type optical system 18 and that of the collimator lens type optical system 14), preferably, be set to be from $5° \leq θ \leq 45°$, more preferably, set to be from $15° \leq θ \leq 35°$.

In the specification of the present invention, the angle defined between the optical axis of the condenser lens type optical system 18 and the optical axis of the condenser lens type optical system 14 is defined as the inferior angle defined between the half line consisting of the optical axis that, with the intersection B between the optical axis of the condenser lens type optical system 18 and that of the collimator lens type optical system 14 being used as the starting point, goes toward the condenser lens type optical system 18 and the half line consisting of the optical axis that, with the intersection point B being used as the starting point, goes toward the collimator lens type optical system 14. Similarly, the angle defined between the normal line vector and the bisector indicated by the broken line in FIG. 2 (the half line equally dividing the angle defined between the optical axis of the collimator lens type optical system 14 and the optical axis of the condenser lens type optical system 18) is defined as being the angle defined between the normal line vector whose the starting point is the intersection B and the bisector whose starting point is the intersection B.

Also, the direction of the normal line vector, when having fixed the starting point of the normal line vector to the point of intersection B, is defined depending on the position of the termination point of the normal line vector. For example, the terminology "the direction in which the normal line vector is directed, with respect to the above-described bisector, toward the side the collimator lens type optical system 14 is disposed" means that, under the assumption that the bisector be made a straight line by extending it, of two regions divided by a plane including this straight line and being parallel to the direction of the slit (the direction perpendicular to the drawing sheet surface), the termination point of the normal line vector is situated in the region where the collimator lens type optical system 14 is disposed. Also, the above-described angle is measured counterclockwise in the illustration.

As described above, by constructing the structure with use of the collimator lens type optical system and the condenser lens type optical system, it is possible to excellently eliminate the astigmatism, coma-aberration, spherical aberration, etc., so that a high spatial resolving power along the direction of the slit can be obtained. Also, as a result of the optical disposition being made as described above, not only the spatial resolving power in the slit direction but also the wavelength resolving power in it could be made high. Specifically, with the spectroscope of this embodiment, when the focal distance is 40 cm, the F value of 2.8 could be achieved. This means that, as compared with the conventional spectroscope the focal distance of which is to almost the same extent, brightness is approximately 4 times higher.

The foregoing description illustrates a schematic construction of this embodiment. More suitable embodiments will be explained below.

Figure 3A:
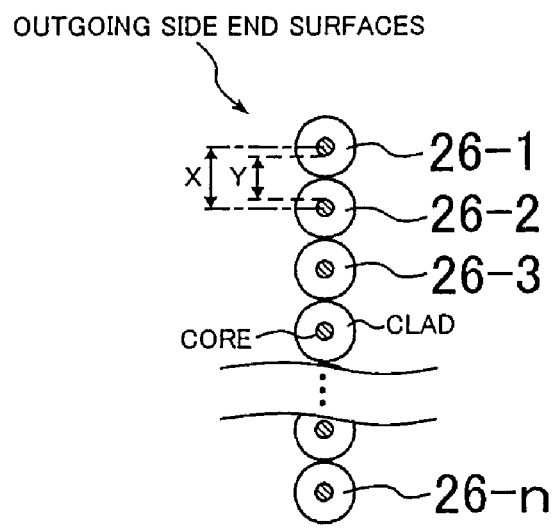
FIG. 3A and FIG. 3B are explanatory views of the installed positions of a plurality of optical fibers.

The spectroscope 10 of the embodiment illustrated in FIG. 1 further comprises an optical fiber holder 24 that holds a plurality of optical fibers 26 that guides the light into the incident slit 12. As illustrated in FIG. 3, the outgoing side end surfaces of the plurality of optical fibers 26-1 to 26-n are held by the optical fiber holder 24 so that the end surfaces may be disposed in a row, at the preceding stage of the incident slit 12, along the slit 12. Here, FIG. 3A is a view that is seen from the incident slit side (the outgoing side end surface), and the FIG. 3B is a view that is seen from the incident slit side-surface side.

Figure 3B:
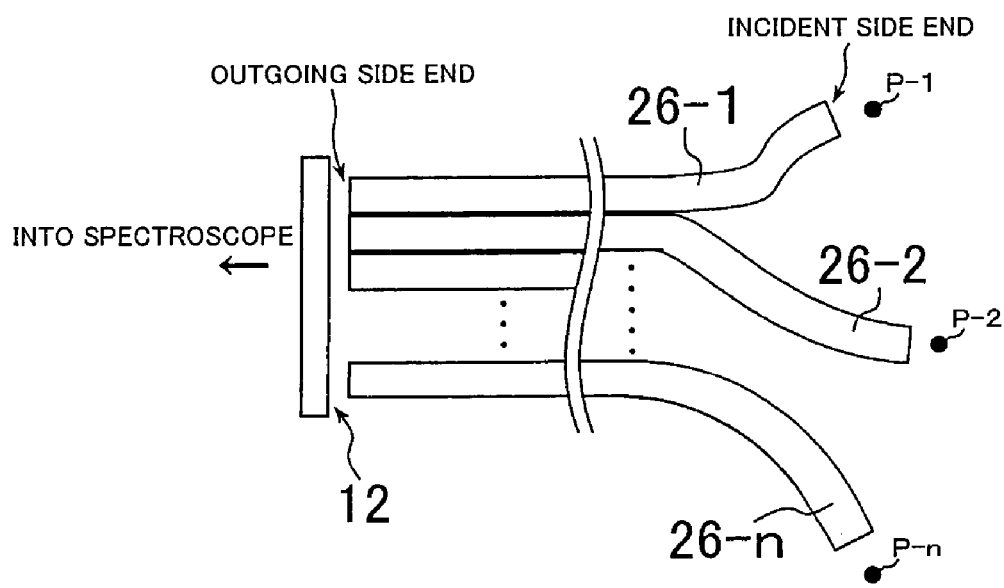
Figure 4:
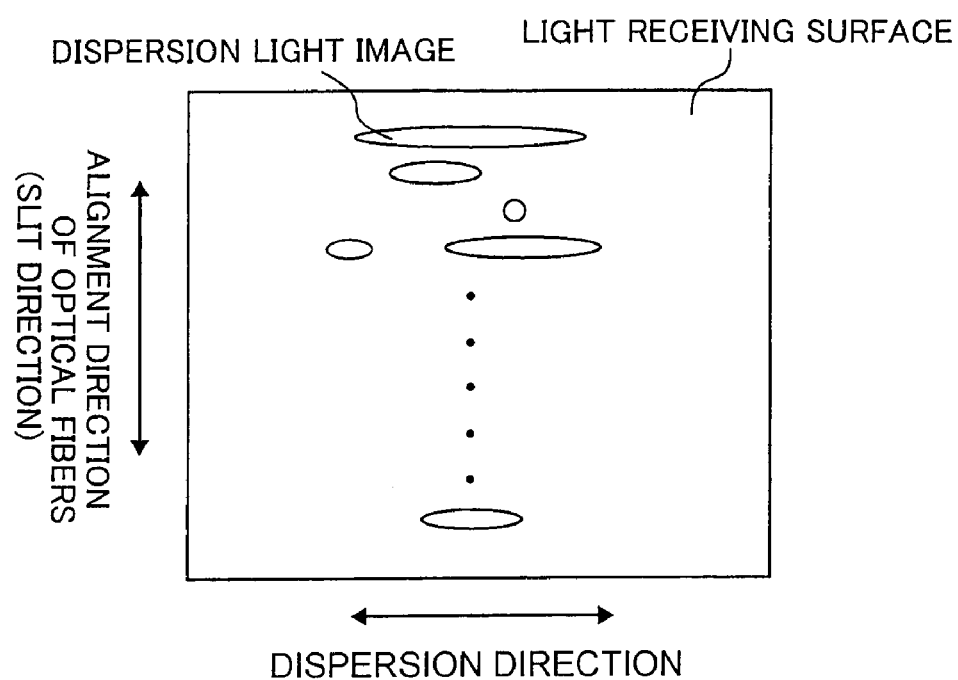
FIG. 4 is an explanatory view of the light images from the optical fibers that were imaged on a light-receiving surface.

The light rays coming from the measuring points indicated by P-1 to P-n of FIG. 3B enter to the incident side end surfaces of the optical fibers 26-1 to 26-n. The optical fibers 26-1 to 26-n guide the light rays into the incident slit 12. And, as illustrated in FIG. 1, the light rays that pass through the incident slit 12 pass through the collimator lens type optical system 14, the diffraction grating 16, and the condenser lens type optical system 18 and are imaged on the light-receiving surface of the two-dimensional detector 20. As illustrated in FIG. 4, one direction of the light receiving surface of the two-dimensional detector 20 correspond to the dispersion direction of the light in the diffraction grating 16, while, on the other hand, the other one direction thereof correspond to the alignment direction of the optical fibers 26-1 to 26-n (the slit direction). Namely, by independently dispersing the light ray from each optical fiber 26-1 to 26-n through the action of the diffraction grating 16 and thereby causing those light rays to be imaged on the light-receiving surface of the two-dimensional detector as the dispersion light images of each optical fiber, spectral measurement is independently done every optical fiber 26-1 to 26-n. Like this, since in the direction intersecting the dispersion direction at a right angle with respect thereto, the dispersion light images having come from the respective optical fibers are arrayed, it is possible, with detection of these made at one time, to perform simultaneous spectral measurement with respect to a number of points (P-1 to P-n of FIG. 3B).

According to the spectroscope of this embodiment, even when optical fibers are arrayed by 100 pieces along the slit (the length of the slit: 30 mm), no cross talks occurs between each optical fibers and 100 pieces of spectrums can simultaneously be measured. The clad diameter of the optical fiber is Φ0.25 mm and the core diameter of that is Φ0.2 mm Like this, it is preferable that the optical fibers be disposed so that the shortest distance (Y of FIG. 3A) between the cores each forming a light-guiding path may be from 0.025 mm to 0.1 mm (in other words the distance X between the centers of the cores of adjacent two of the optical fibers may be from r+r'+0.025 mm to r+r'+0.1 mm, where 2r and 2r' each represent the diameter of an adjacent core). In this way, even in a case where adjacent cores are made closer to each other, it is possible to perform simultaneous spectral measurement of the light rays from the respective optical fibers without being accompanied by any cross talks between the optical fibers.

Figure 5:
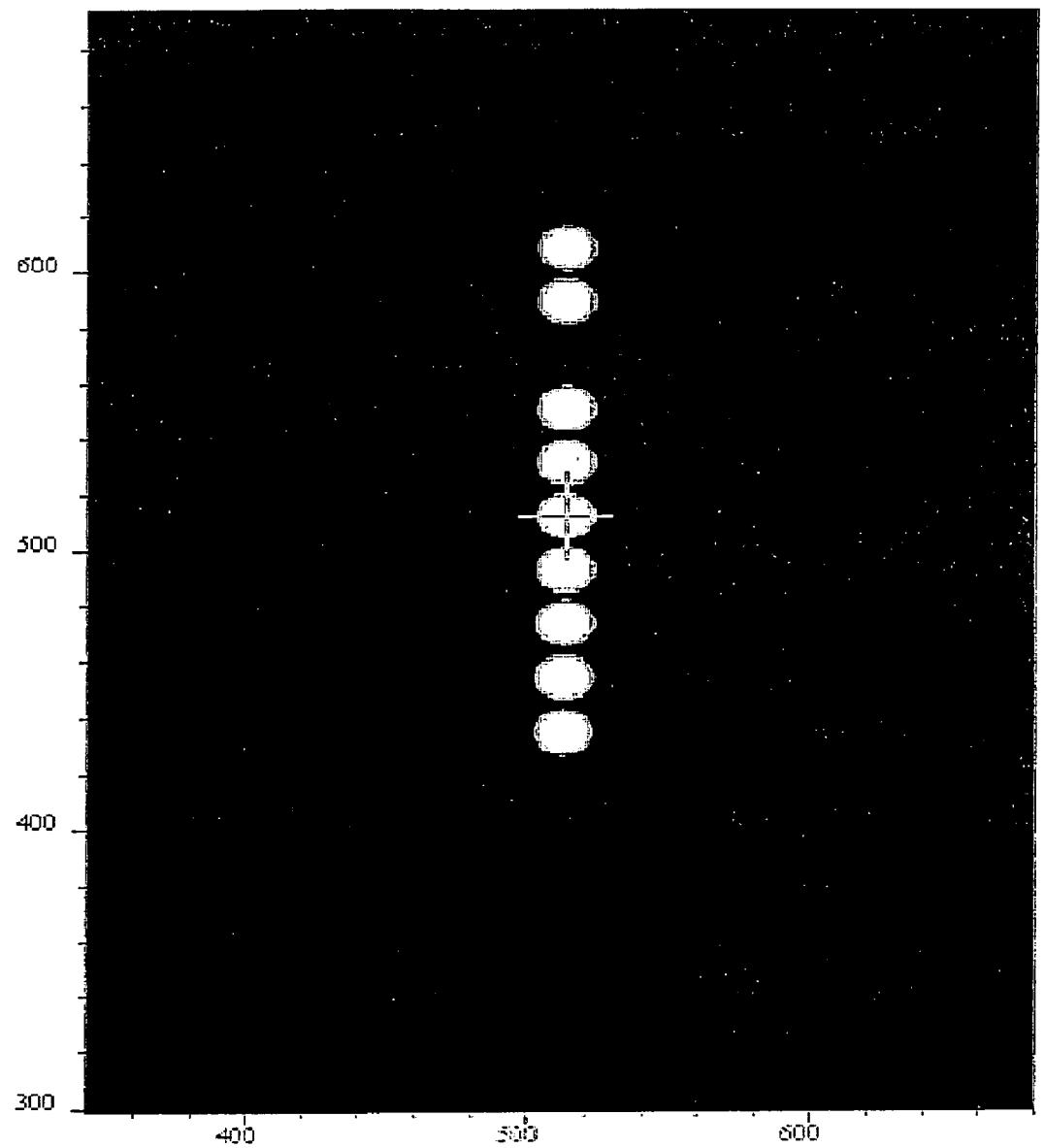
FIG. 5 illustrates test-measurement data (CCD picture image) of the spectroscope according to the embodiment of the present invention.
Figure 6:
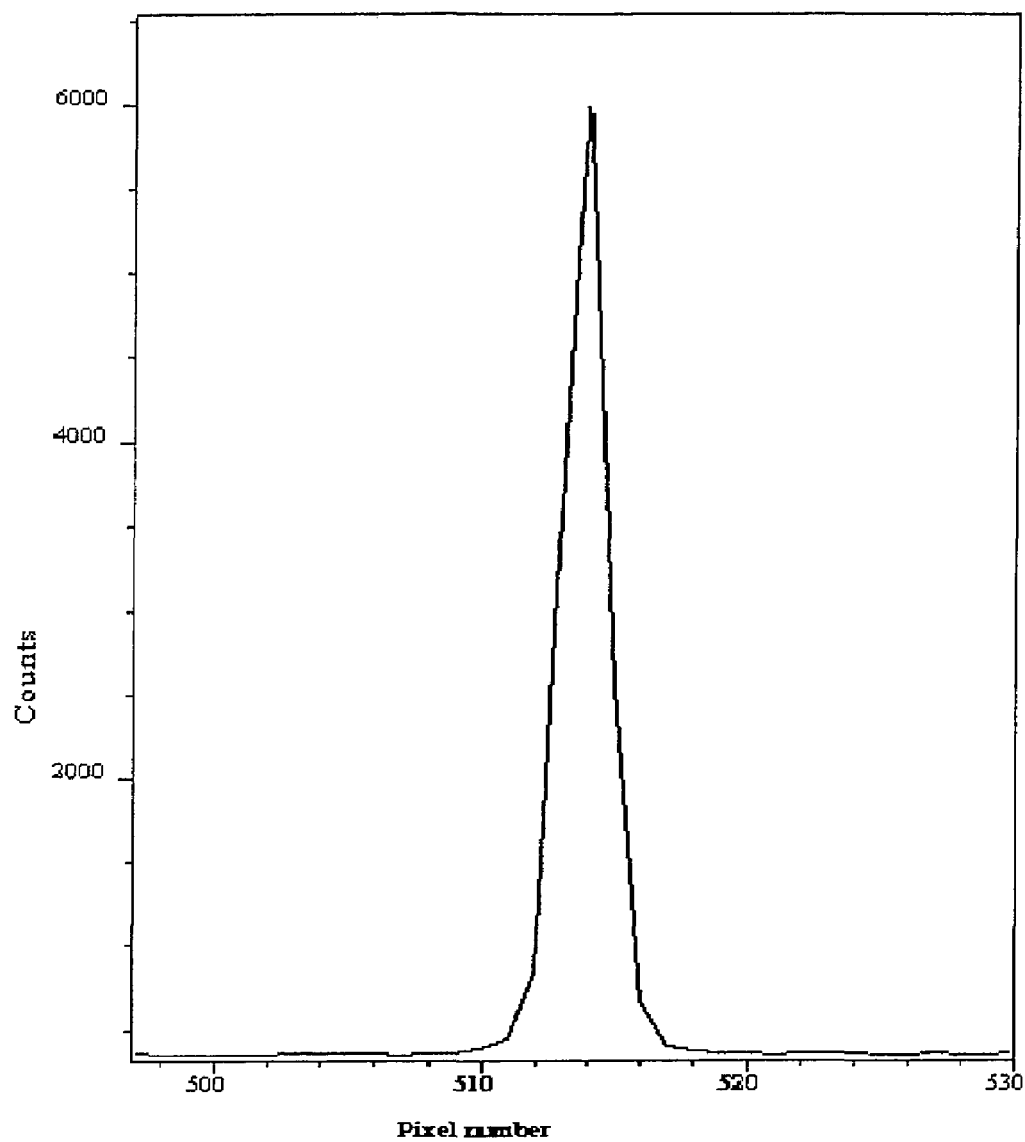
FIG. 6 illustrates test-measurement data (spectral data) of the spectroscope according to the embodiment of the present invention.
Figure 7:
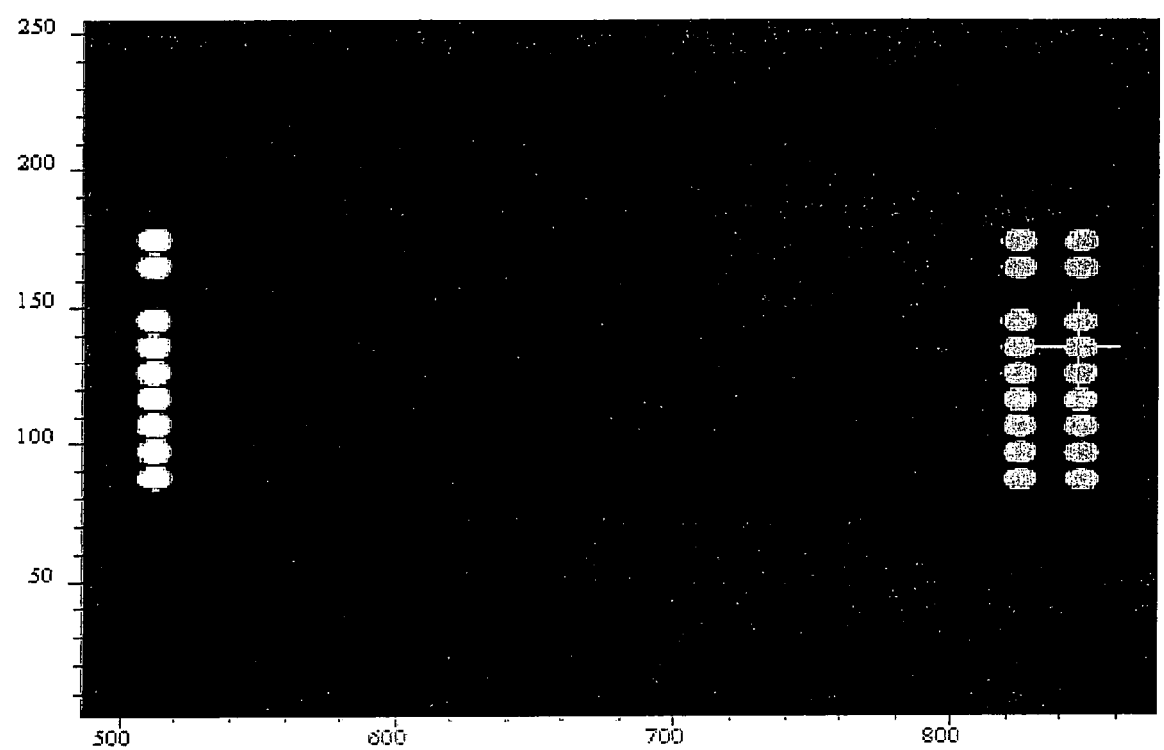
FIG. 7 illustrates test-measurement data (CCD picture image) of the spectroscope according to the embodiment of the present invention.

Actually, using the light rays from a Hg lamp as those for measurement, a test was conducted on the spectroscope (the focal distance: 100 mm) of the above-described embodiment. The results are shown in FIGS. 5 to 7. 10 pieces of the optical fibers was used in the way in which they were adjacent to each other (however, of those ten pieces, one piece of optical fiber had no light passed therethrough). The core diameter of the optical fiber was Φ0.2 mm and the clad diameter of that was Φ0.25 mm. That is, the distance between adjacent two optical fibers is approximately 0.05 mm. FIG. 5 illustrates the picture image data that, when having measured 435.84 nm ray from the Hg lamp, was detected by the CCD detector (the light-receiving surface: 1024×1024 pixel; and the size of one pixel is 13 µm×13 µm). Also, FIG. 6 is the spectrum of the 435.84 nm ray from the Hg lamp (provided that the width of the slit was set to be 10 µm). Also, FIG. 7 illustrates the picture image data that, when having measured 546.07 nm, 576.96 nm, and 579.07 nm rays, was detected by the CCD detector (the light-receiving surface: 1024×256 pixel; and the size of one pixel is 26 µm×26 µm). As is apparent from these items of data, it is understood that the light rays emitted from adjacent optical fibers are imaged on the light-receiving surface without being mixed together. Also, regarding the wavelength resolving power as well, it is understood that good results are obtained.

Because a limitation is imposed upon the length of the slit and the size of the light-receiving surface of the detector, that optical fibers can be arrayed with a high density like that is requisite for performing simultaneous spectral measurement of light rays from a number of points. In case of the conventional spectroscope, when the distance between the adjacent cores is made short as described above, cross talks inconveniently occur between the optical fibers. Therefore, actually, only half, or less, of the spectroscope of this embodiment could be used as the actual light-guiding paths. However, since according to the spectroscope of this embodiment even if the cores are made closer to each other no cross talks occurs, the spectroscope of this embodiment enables using more optical fibers than in the conventional spectroscope that is same size of the spectroscope of this embodiment. So, with respect to more points, the present invention can perform simultaneous spectral measurement.

Also, in case of the construction wherein optical fibers are used, it is directed to measuring the visible light region. Therefore, in that construction, ultraviolet rays can be eliminated by using lenses, and therefore it has the merit, as well, that it can cut stray light other than the measured-wavelength region.

Figure 8:
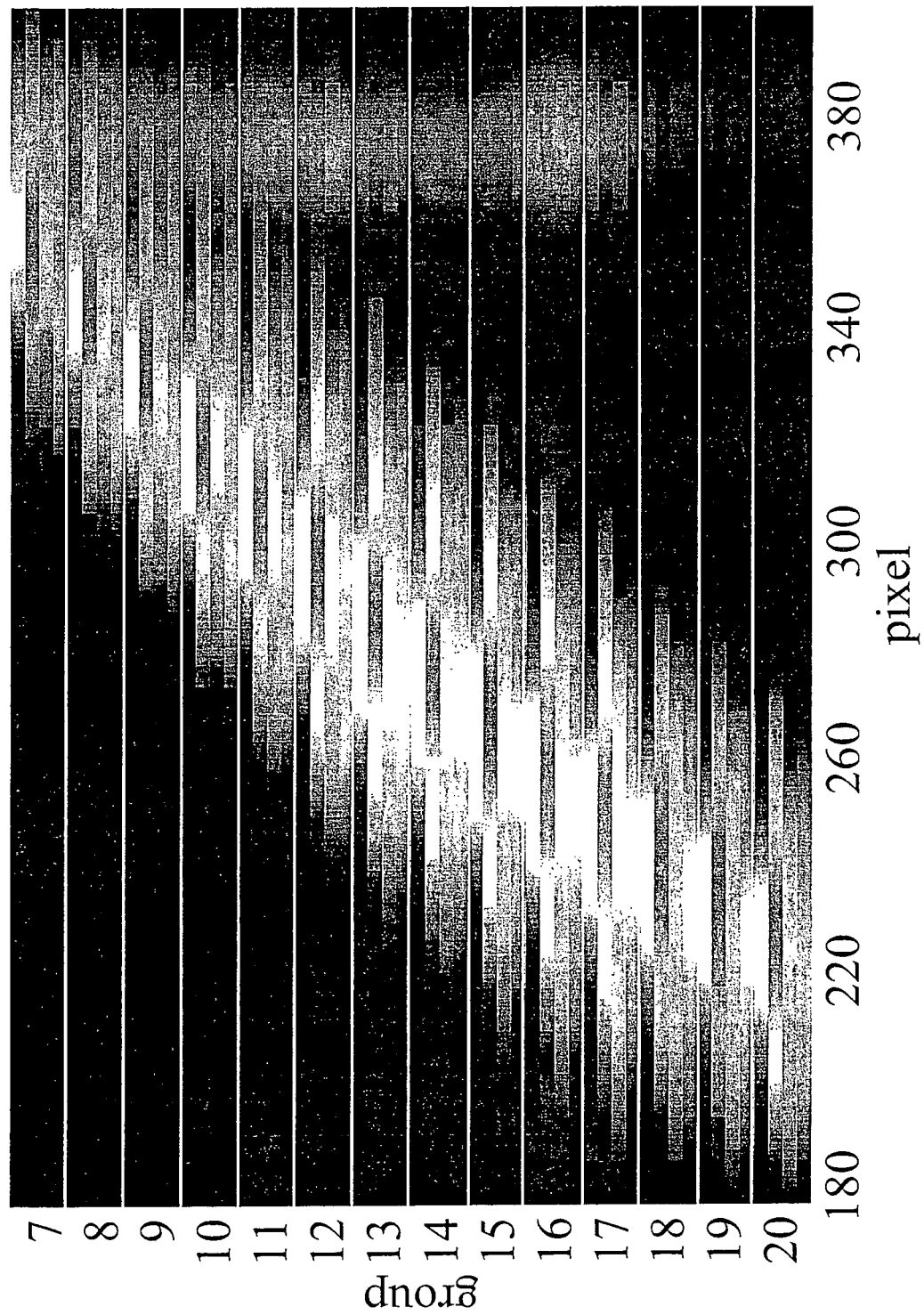
FIG. 8 is a view illustrating measured results (CCD picture image) obtained through measurement that was made using the spectroscope according to the embodiment of the present invention.
Figure 9:
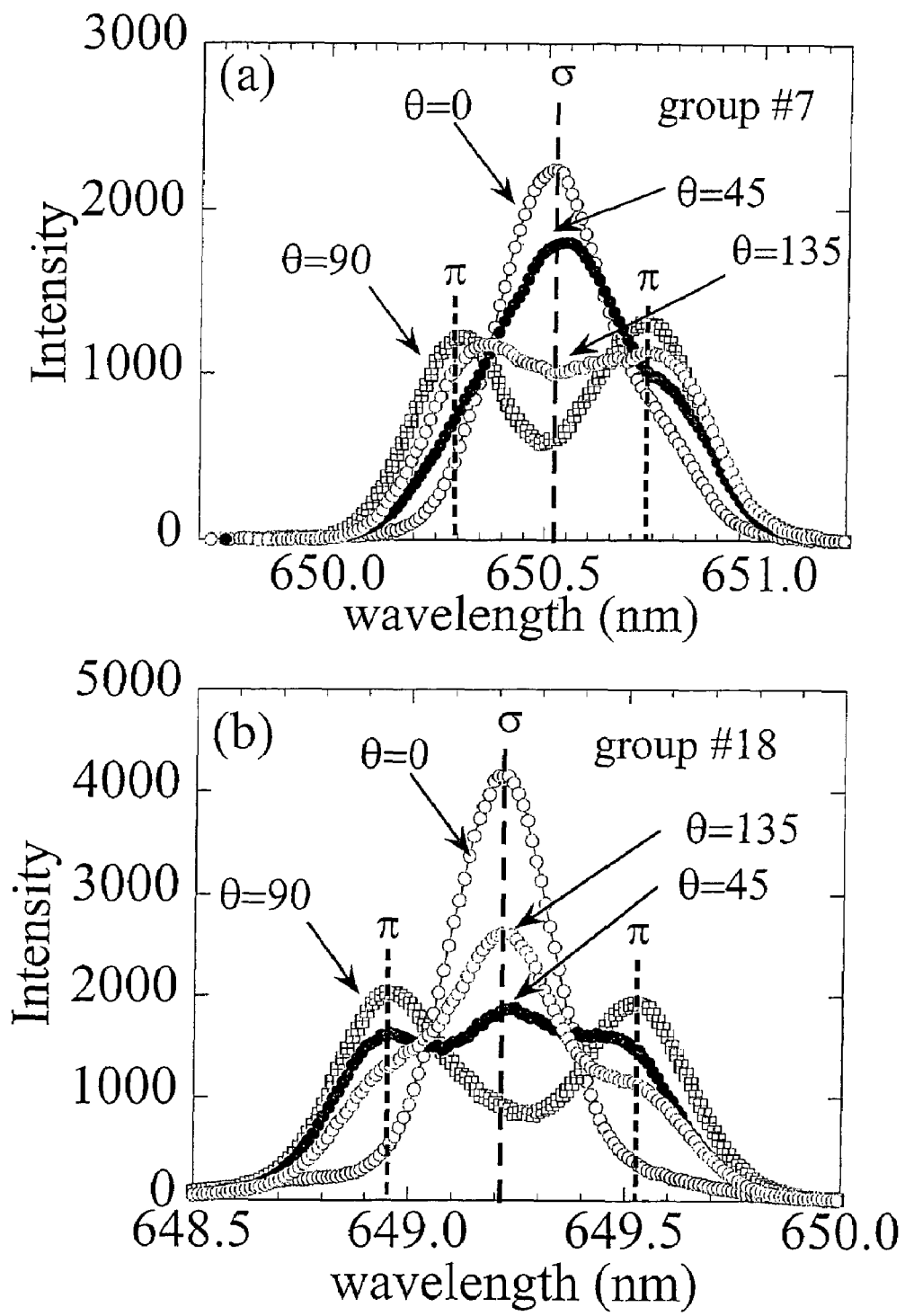
FIG. 9 is a view illustrating measured results (spectral data) obtained through measurement that was made using the spectroscope according to the embodiment of the present invention.

Further, in FIGS. 8 and 9, there are shown the measured results that were obtained when, using the above-described apparatus construction, measurement was made using the plasma of a large-sized helical apparatus as the object to be measured. Here, 100 pieces of optical fibers were divided into 25 groups, and, with respect to these 25 measuring points, simultaneous spectral measurements were performed. Also, regarding 4 pieces of optical fibers in each group, it was arranged that measurement light rays coming from the same place be received via the polarizers disposed on their respective different transmission axes (0°, 90°, 45°, and 135°). Also, regarding the spectroscope, the focal distance was 40 cm and the F value was 2.8, and, regarding the two-dimensional detector, there was used the CCD detector having 1340×1300 pixels. FIG. 8 shows a part of the imaged picture-image data that was obtained through the use of the CCD detector. FIG. 9 shows a part of the spectral data, obtained, of a number of measurement points. Like this, in a lot of simultaneous spectral measurements, excellent results could be obtained.

Next, an explanation will be given of an embodiment that is executed when performing mapping measurement of an object to be measured by using the spectroscope illustrated in FIG. 1.

Figure 10:
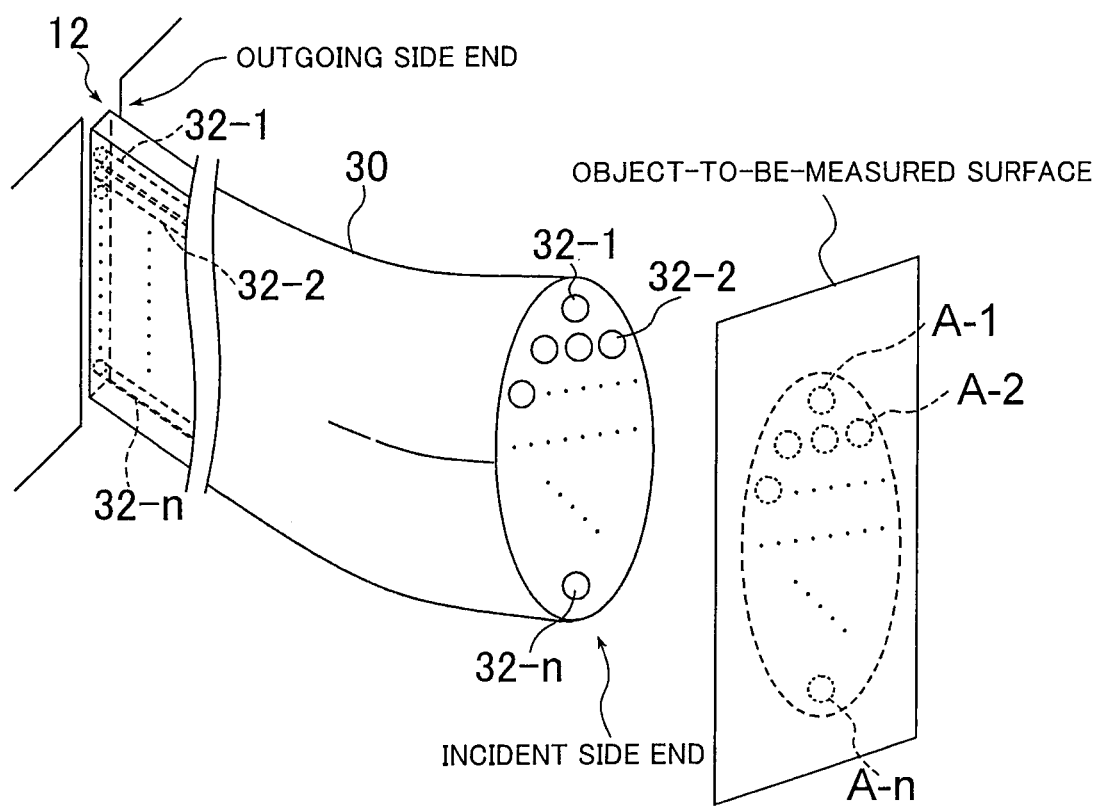
FIG. 10 is an explanatory view illustrating a mapping measurement conducted using an optical fiber bundle.

As illustrated in FIG. 10, as the optical fibers for guiding a light to the incident slit 12, there is used an optical fiber bundle 30 prepared by bundling a plurality of optical fibers 32-1 to 32-n. However, on the outgoing side end surface that is disposed at a stage immediately preceding the incident slit 12, optical fibers are bundled in such a manner as they are disposed on the slit in a row, and the incident side end surface that is disposed on the object-to-be-measured surface side has its optical fibers two-dimensionally bundled. And, each of the optical fibers 32-1 to 32-n receives by the incident side end surface a light ray from that point of the object-to-be-measured surface which corresponds to the relevant optical fiber, thereby it guides its individual relevant light ray to the incident slit 12.

The light ray given forth to the incident slit 20 from the outgoing side end surface of each optical fiber 32-1 to 32-n is spectrally resolved, as in the above-described case, by the diffraction grating and then is spectrally measured by the two-dimensional detector. In other words, the light ray from each of the optical fibers 32-1 to 32-n corresponds to the light ray from a relevant one of the A-1 to A-n positions of the object-to-be-measured surface illustrated in FIG. 10, namely performs simultaneous spectral measurement of the light ray that comes from each of those positions. Mapping measurement can be done by performing, in the data processing unit, data storage in such a way as the measuring position information on the object-to-be-measured surface (corresponding to its relevant optical fiber) corresponds to the spectral data at that point.

According to the spectroscope of this embodiment, since compared with the conventional spectroscope the spatial resolving power thereof along the direction of the slit is high, the light rays from the respective points of the object-to-be-measured surface can be measured without being mixed with one another. Consequently, mapping measurement with high resolving power could be achieved.

What is claimed is:

1. A spectroscope comprising:
an incident slit;
a collimator lens type optical system that makes the light rays passing through the incident slit parallel light rays;
a diffraction grating that receives the parallel light rays and, according to a wavelength, outputs the light rays at different angles;
a condenser lens type optical system that condenses the output light from the diffraction grating; and
a two-dimensional light-receiving detector having a two-dimensional light-receiving surface that detects the light rays that have been condensed by the condenser lens type optical system;
wherein the collimator lens type optical system and the condenser lens type optical system are disposed so that an angle $2\gamma$ defined between an optical axis of the collimator lens type optical system and an optical axis of the condenser lens type optical system is acute;
the condenser lens type optical system is disposed so that a distance between itself and the diffraction grating is shorter than a distance between the collimator lens type optical system and the diffraction grating;
the diffraction grating is a reflection type diffraction grating, whereby a setting is made so that a normal line vector at a central point of the reflection surface is directed, from a bisector of the angle defined between the optical axis of the collimator lens type optical system and the optical axis of the condenser lens type optical system, toward a side where the collimator lens type optical system is disposed; and
the light rays passing through the incident slit are dispersed by the diffraction grating to cause a dispersion light image of the slit to be imaged on the light-receiving surface of the two-dimensional detector to spectrally measure respective points along a direction of the slit;
wherein the optical systems are disposed so that the angle $2\gamma$ defined between the optical axis of the collimator lens type optical system and the optical axis of the condenser lens type optical system is in a range of from $20° \leq 2\gamma \leq 40°$; and a setting is done so that the angle $\theta$ defined by the bisector with respect to the normal line vector of the diffraction grating is in a range of from $15° \leq \theta \leq 35°$.

2. The spectroscope according to claim 1, wherein the optical systems are disposed so that the angle $2\gamma$ defined between the optical axis of the collimator lens type optical system and the optical axis of the condenser lens type optical system is in a range of from $20° \leq 2\gamma \leq 30°$.

3. The spectroscope according to claim 2, wherein
the angle $\theta$ defined between the bisector and the normal line vector of the diffraction grating is set so that $\theta > \gamma$.

4. The spectroscope according to claim 1, wherein
the spectroscope includes a plurality of optical fibers that have been arrayed in a row along the incident slit, causes the light rays from respective optical fibers to enter from the incident slit, cause dispersion thereof by the diffraction grating, and causes the dispersion light images from the respective optical fibers to be imaged on the light-receiving surface of the two-dimensional detector, thereby independently spectrally measuring in units of an optical fiber.

5. The spectroscope according to claim 4, wherein
as said plurality of optical fibers, an optical fiber bundle is used; at the outgoing side end surface of the optical fiber bundle, the outgoing side end portions of the plurality of optical fibers are arrayed in a row along the incident slit; at the incident side end surface, the incident side end portions of the optical fibers are two-dimensionally arrayed; and the light rays from the object-to-be-measured surface are received by the incident side end surface of the optical fiber bundle, thereby performing mapping measurement of the object-to-be-measured surface.

6. The spectroscope according to claim 4 wherein
the plurality of optical fibers arrayed in the slit direction are disposed so that the shortest distance between the cores of adjacent two of the optical fibers is in a range of from 0.025 mm to 0.1 mm.

7. The spectroscope according to claim 5, wherein
the plurality of optical fibers arrayed in the slit direction are disposed so that the shortest distance between the cores of adjacent two of the optical fibers is in a range of from 0.025 mm to 0.1 mm.

* * * * *